(12) United States Patent  
Milstein et al.

(10) Patent No.: US 11,615,448 B2
(45) Date of Patent: Mar. 28, 2023

(54) METHOD AND SYSTEM OF FACILITATING A PURCHASE BETWEEN A BUYER AND A SELLER

(71) Applicant: EMIGRANT BANK, New York, NY (US)

(72) Inventors: Howard P. Milstein, New York, NY (US); David M. Seldin, Tierra Verde, FL (US); Daniel P. Gregerson, San Anselmo, CA (US)

(73) Assignee: EMIGRANT BANK, New York, NY (US)

( * ) Notice: Subject to any disclaimer, the term of this patent is extended or adjusted under 35 U.S.C. 154(b) by 131 days.

(21) Appl. No.: 15/677,767

(22) Filed: Aug. 15, 2017

(65) Prior Publication Data

US 2017/0352076 A1    Dec. 7, 2017

Related U.S. Application Data

(63) Continuation of application No. 12/038,330, filed on Feb. 27, 2008, now Pat. No. 9,785,984.
(Continued)

(51) Int. Cl.
*G06Q 30/00* (2012.01)
*G06Q 30/06* (2023.01)
(Continued)

(52) U.S. Cl.
CPC ............. *G06Q 30/06* (2013.01); *G06Q 20/02* (2013.01); *G06Q 30/02* (2013.01);
(Continued)

(58) Field of Classification Search
CPC combination set(s) only.
See application file for complete search history.

(56) References Cited

U.S. PATENT DOCUMENTS 4,960,981 A * 10/1990 Benton ................. G06Q 40/02
705/41
5,574,269 A   11/1996 Mori et al.
(Continued)

FOREIGN PATENT DOCUMENTS

JP    09-245255    9/1997
JP    2000-076554    3/2000
(Continued)

OTHER PUBLICATIONS

Jon M. Peha et al., "PayCash: A Secure Efficient Internet Payment System", http://portal.acm.org/ft_gateway.cfm?id=948022&type=pdf$coll=Portal&dl-GUIDE&CFID-309523&CFTOKEN-74761681, 2003.
(Continued)

*Primary Examiner* — Alvin L Brown
(74) *Attorney, Agent, or Firm* — DLA Piper LLP (US)

(57) ABSTRACT

Methods and systems of facilitating at least one purchase over at least one network between at least one buyer and at least one seller are disclosed. Personal information from the at least one buyer can be stored. The personal information can be utilized to assign at least one account identifier to the at least one buyer. The at least one buyer can use the at least one account identifier to process payment over the at least one network for the at least one purchase from the at least one seller, such that the at least one seller does not obtain the personal information of the at least one buyer.

20 Claims, 4 Drawing Sheets

Related U.S. Application Data

(60) Provisional application No. 60/891,810, filed on Feb. 27, 2007.

(51) Int. Cl.
  *G06Q 20/02* (2012.01)
  *G06Q 30/02* (2023.01)
  *G06Q 30/0207* (2023.01)

(52) U.S. Cl.
  CPC ..... *G06Q 30/0215* (2013.01); *G06Q 30/0236* (2013.01); *G06Q 30/0239* (2013.01)

(56) References Cited

U.S. PATENT DOCUMENTS

| | | | |
|---|---|---|---|
| 5,689,100 | A | 11/1997 | Carrithers et al. |
| 6,105,001 | A | 8/2000 | Masi et al. |
| 6,450,407 | B1 | 9/2002 | Freeman et al. |
| 6,760,470 | B1 | 7/2004 | Bogosian et al. |
| 6,895,386 | B1 | 5/2005 | Bachman et al. |
| 7,020,541 | B2 | 3/2006 | Wilson |
| 7,181,438 | B1 | 2/2007 | Szabo |
| 7,707,120 | B2 | 4/2010 | Dominguez et al. |
| 2001/0003202 | A1 | 6/2001 | Mache et al. |
| 2001/0011250 | A1 | 8/2001 | Paltenghe |
| 2001/0037241 | A1 | 11/2001 | Puri |
| 2002/0019781 | A1 | 2/2002 | Shooks et al. |
| 2002/0040350 | A1 | 4/2002 | Shinzaki |
| 2002/0069244 | A1 | 6/2002 | Blair et al. |
| 2002/0095387 | A1 | 7/2002 | Sosa et al. |
| 2003/0018577 | A1 | 1/2003 | Fukushima et al. |
| 2003/0088462 | A1 | 5/2003 | Carrithers et al. |
| 2003/0163416 | A1 | 8/2003 | Kitajima |
| 2003/0200184 | A1 | 10/2003 | Dominguez et al. |
| 2003/0233278 | A1 | 12/2003 | Marshall |
| 2004/0015690 | A1 | 1/2004 | Torigai et al. |
| 2004/0199422 | A1 | 10/2004 | Napier et al. |
| 2004/0243465 | A1 | 12/2004 | Manners |
| 2004/0243467 | A1 | 12/2004 | Ewell et al. |
| 2004/0254893 | A1 | 12/2004 | Tsuei et al. |
| 2004/0254894 | A1 | 12/2004 | Tsuei et al. |
| 2005/0004839 | A1 | 1/2005 | Bakker et al. |
| 2005/0086160 | A1 | 4/2005 | Wong et al. |
| 2005/0247777 | A1 | 11/2005 | Pitroda |
| 2006/0091203 | A1 | 5/2006 | Bakker et al. |
| 2006/0259422 | A1 | 11/2006 | Sutton et al. |
| 2006/0277111 | A1* | 12/2006 | Bevis ............... G06Q 20/04 705/26.1 |
| 2007/0022375 | A1 | 1/2007 | Walker |
| 2007/0083460 | A1* | 4/2007 | Bachenheimer ....... G06Q 20/02 705/38 |
| 2008/0052244 | A1 | 2/2008 | Tsuei et al. |
| 2009/0132351 | A1* | 5/2009 | Gibson .............. G06Q 20/02 705/12 |
| 2010/0063895 | A1 | 3/2010 | Dominguez et al. |
| 2010/0332583 | A1 | 12/2010 | Szabo |
| 2014/0143041 | A1* | 5/2014 | de Boer ............ B01J 23/6562 705/14.28 |
| 2014/0149254 | A1 | 5/2014 | Eubanks |

FOREIGN PATENT DOCUMENTS

| | | |
|---|---|---|
| JP | 2001-203745 | 7/2001 |
| JP | 2002-007904 | 1/2002 |
| JP | 2002-109409 | 4/2002 |
| JP | 2002-123633 | 4/2002 |
| JP | 2002-524797 | 8/2002 |
| JP | 2002-334285 | 11/2002 |
| JP | 2003-122946 | 4/2003 |
| JP | 2003-248780 | 9/2003 |
| JP | 2004-514200 | 5/2004 |
| JP | 2005-523505 | 8/2005 |
| KR | 2001-0068434 | 7/2001 |
| WO | WO 00/14648 | 3/2000 |
| WO | WO 02/08992 | 1/2002 |
| WO | WO 02/26021 | 4/2002 |
| WO | WO 03/090027 | 10/2003 |
| WO | WO 2005/001670 | 1/2005 |
| WO | WO 2006/18856 | 2/2006 |

OTHER PUBLICATIONS

Ronald J. Mann, "Regulating Internet Payment Intermediaries", http://delivery.acm.org/10.1145/950000/948053/p376-mann.pdf?key1=948053$key2=7913204511&coll=Portal&dl-GUIDE&CFID-309523&CFTOKEN=74761681, 2003.
Payments on My Financial Account, http://dakota.byu.edu/tuition/payment.aspx, 5 pages, printed Aug. 3, 2006.
The Automated Clearing House (ACH), http://www.achnetwork.com/introtoach.html, 15 pages, printed Jul. 12, 2006.
https://www.paypal.com, 16 pages, printed Aug. 3, 2006.
https://www.paypal.com, 10 pages, printed Oct. 12, 2006.
http://Technocash.com, 8 pages, printed Aug. 3, 2006.
http://www.googlecheckout.com, 2 pages, printed Jun. 10, 2008.
International Search Report issued in Application No. PCT/US08/055099 dated Jun. 27, 2008.
Written Opinion issued in Application No. PCT/US08/055099 dated Jun. 27, 2008.
Supplementary European Search Report issued in EP 08743572, dated Dec. 14, 2011.
Office Action issued in AU 2008221420, dated Feb. 21, 2012.
Partial English language translation of Office Action issued in MX/a/2009/008826, dated Jul. 28, 2011.
Partial English language translation of Office Action issued in MX/a/2009/008826, dated Jan. 16, 2012.
Partial English language translation of Office Action issued in MX/a/2009/008826, dated Sep. 5, 2012.
English translation of Office Action issued in JP 2009-551815, dated Sep. 25, 2012.
English language abstract of JP 2002-109409, published Apr. 12, 2002.
Machine English language translation of JP 2002-109409, published Apr. 12, 2002.
English language abstract of JP 2003-248780, published Sep. 5, 2003.
Machine English language translation of JP 2003-248780, published Sep. 5, 2003.
English language abstract of JP 2002-007904, published Jan. 11, 2002.
Machine English language translation of JP 2002-007904, published Jan. 11, 2002.
Israeli Office Action issued in IL 200282 dated Nov. 28, 2012.
English language translation of Israeli Office Action issued in IL 200282 dated Nov. 28, 2012.
English Translation of Mexican Office Action issued in MX/a/2009/008826 dated Mar. 25, 2013.
Japanese Office Action issued in JP 2013-021671 dated Feb. 4, 2014.
English Language Translation of Japanese Office Action issued in JP 2013-021671 dated Feb. 4, 2014.
English Language Abstract and Translation of JP 09-245255 published Sep. 19, 1997.
English Language Abstract and Translation of JP 2001-203745 published Jul. 27, 2001.
English Language Abstract and Translation of JP 2002-334285 published Nov. 22, 2002.
English Language Abstract and Translation of JP 2003-122946 published Apr. 25, 2003.
English Language Abstract and Translation of JP 2005-523505 published Aug. 4, 2005.
Office Action issued in European Application No. EP 08743572, dated Jun. 11, 2014.
English language Translation of Office Action issued in Japanese Application No. 2013-229846, dated Jul. 23, 2014.
Office Action issued in Israel Application No. 200282, dated Jul. 9, 2014.

(56) References Cited

OTHER PUBLICATIONS

Partial English language translation of Office Action issued in Israel Application No. 200282, dated Jul. 9, 2014.
English language translation of JP 2004-514200, published May 13, 2004.
English language abstract and translation of JP 2000-076554, published Mar. 14, 2000.
Office Action issued in Korean Application No. 10-2009-7019875 dated Sep. 30, 2015.
English language Translation of Office Action issued in Korean Application No. 10-2009-7019875 dated Sep. 30, 2015.
English language translation of KR-2001-0068434 published Jul. 23, 2001.
Office Action issued in Canadian Application No. 2,678,884 dated Oct. 21, 2015.
Office Action issued in Canadian Application No. 2,678,884 dated Nov. 17, 2014.
English language translation of Office Action issued in Japanese Application No. 2009-551815 dated May 26, 2015.
English language translation of JP 2002-123633 published Apr. 26, 2002.
English language translation of JP 2002-524797 published Aug. 6, 2002.
Office Action issued in Japanese Application No. 2013-229846 dated Aug. 18, 2015.
English language translation of Office Action issued in Japanese Application No. 2013-229846 dated Aug. 18, 2015.
Office Action issued in Brazilian Application No. PI0808121-2 dated Sep. 24, 2018.
Partial English language translation of Office Action issued in Brazilian Application No. PI0808121-2 dated Sep. 24, 2018.

\* cited by examiner

METHOD AND SYSTEM OF FACILITATING A PURCHASE BETWEEN A BUYER AND A SELLER

CROSS-REFERENCE TO RELATED APPLICATION

This application is a continuation of U.S. patent application Ser. No. 12/038,330, filed Feb. 27, 2008, which claims benefit to U.S. Provisional Application 60/891,810, filed on Feb. 27, 2007, and entitled "A Method and System of Facilitating a Purchase Between a Buyer and a Seller", which are herein incorporated by reference in their entireties.

DETAILED DESCRIPTION OF EMBODIMENTS OF THE INVENTION

Figure 1:
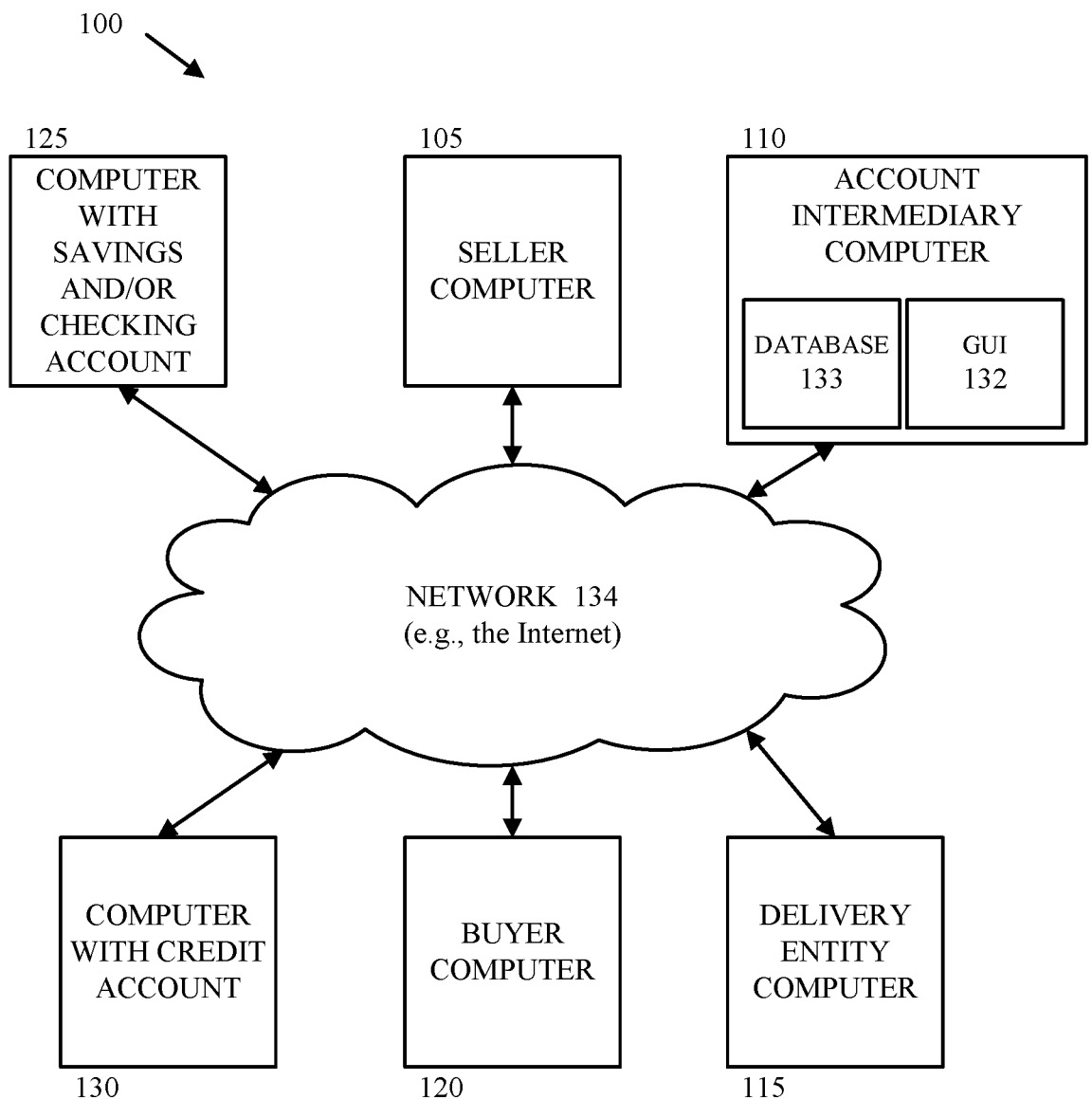
FIG. 1 illustrates a computerized system for facilitating an online purchase between a buyer and a seller, according to one embodiment of the invention.

FIG. 1 illustrates a computerized system 100 for facilitating an online purchase between a buyer and a seller, according to one embodiment of the invention. Note that while the buyer, seller, and intermediary can communicate with each other using computers 105, 120, and 110 respectively (as explained in detail below), the buyer, seller, and/or intermediary can also communicate in person (e.g., a buyer can set up an account with the intermediary in person; a buyer can make a purchase from a seller in person; the seller can communicate with the intermediary in person). In addition, note that the term "computer" used in this document can mean any type of device with computer capabilities (e.g., PC, phone, mobile device, PDA, GPS, computer, server, processor, computer system utilizing at least one computer, etc.). Referring to FIG. 1, the buyer can set up an account with an intermediary. In one embodiment, the buyer can utilize a buyer's computer 120, such as a client computer, to set up an account and communicate with an intermediary. In one embodiment, the intermediary can utilize the intermediary's computer 110, such as a server computer, which can be accessed through a network 134 by the buyer's computer 120 and/or a seller's computer 105. In some embodiments, the seller's computer 105, such as a client computer, can also be used by the seller to communicate over the network 134 with the intermediary's computer 110. (Note that, while the buyer's computer 120 and seller's computer 105 can have the relationship of client computer to the intermediary's computer 110, which can function as a server, the buyer's computers 120 and the seller's computer 105 can also be server computers in other relationships to other computers.) However, in one embodiment, the seller's computer 105 does not need to communicate over the network 134 with the intermediary's computer 110. For example, if the intermediary has a relationship with a credit card company to process its account identifiers, the seller may not even know that the intermediary exists or is being used. The intermediary's computer 110 can include GUIs 132 (graphical user interface screens) which allow the buyer and/or seller to exchange information (e.g., account information, personal information, alias information) with the intermediary's computer 110 in a user-friendly manner. The intermediary's computer 110 can also include a database 133, which can store information (e.g., account information, personal information, alias information). The intermediary's computer 110 can be linked to a cash account (e.g., a savings and/or checking account) and/or a credit account (e.g., line of credit, credit card), or any other account. The linking can be done by the buyer providing the account information to the intermediary (e.g., over the phone, by computer) to be stored in the intermediary's database 133. The linking can also be done by the intermediary's computer 110 actually linking electronically to the computer 125 associated with the savings account and/or checking account and/or computer 130 associated with the credit account. In one embodiment, the buyer can provide authorization for this electronic linking. In one embodiment, the intermediary's computer 110 can assign the buyer an account identifier, which the buyer can use. In one embodiment, the account identifier can be an already existing identifier (e.g., a credit card number, debit card number). In one embodiment, the account identifier does not include personal information of the buyer. Thus, the account identifier does not give the seller, or any other entity that obtains the account identifier, any information about the personal identity of the buyer associated with the account identifier (e.g., name, address, phone). When the buyer wishes to purchase an item or service, he can access, through the buyer's computer 120 and the network 134, a seller's website on the seller's computer 105 and choose a payment option involving the intermediary (e.g., a link to the intermediary's website on the intermediary's computer 110 or a field on the seller's website used to enter in payment information—such as credit card information). It should be noted that, in one embodiment, if an already existing identifier (e.g., credit card number, debit card number, bank account number) is used as the account identifier, and the already existing identifier is tied to an intermediary, the buyer would only need to provide the account identifier and would not need to provide his name. In another embodiment, the already existing identifier could be provided with an alias name (explained in more detail with respect to FIG. 4 below) instead of the buyer's name so that the seller's website on the seller's computer 105 could use the seller's website's existing payment process (e.g., where a buyer normally enters credit card information, debit card information, or other account information and a name to trigger a transaction). In one embodiment, the intermediary could have a relationship with a credit card company, so that the seller would not need to set up a new mechanism on its web site on seller's computer 105 to accommodate the intermediary's system. In this case, the buyer could enter in the account identifier given to him by the intermediary and an alias name in a manner that the seller uses to accept credit card information. For example, if the intermediary has a relationship with Visa, the buyer could enter in the account identifier and (if required or requested) designate that the account is a Visa account. The seller could then send the buy request to Visa with the account identifier. Visa could then receive the account identifier, determine that it is an intermediary account identifier, and then either approve the buy request (if authorized to do so) or contact the intermediary for payment approval. In addition, in another embodiment, the seller's website on seller's computer 105 could be modified so that the existing payment mechanism does not require entry of a name.

The buyer, through buyer's computer 120, can choose the item and/or service he wishes to purchase on the seller's website on seller's computer 105, and then, for payment information, utilize the account identifier. In this way, in some embodiments, the seller does not obtain the personal information of the buyer. However, note that, in an optional embodiment, the buyer can choose to disclose personal information to the seller. For example, if the buyer wishes a particular seller to have the buyer's information for mailing list purposes (e.g., name, address), the buyer can provide some personal information to the seller, either on his own, or using the intermediary.

Figure 3:
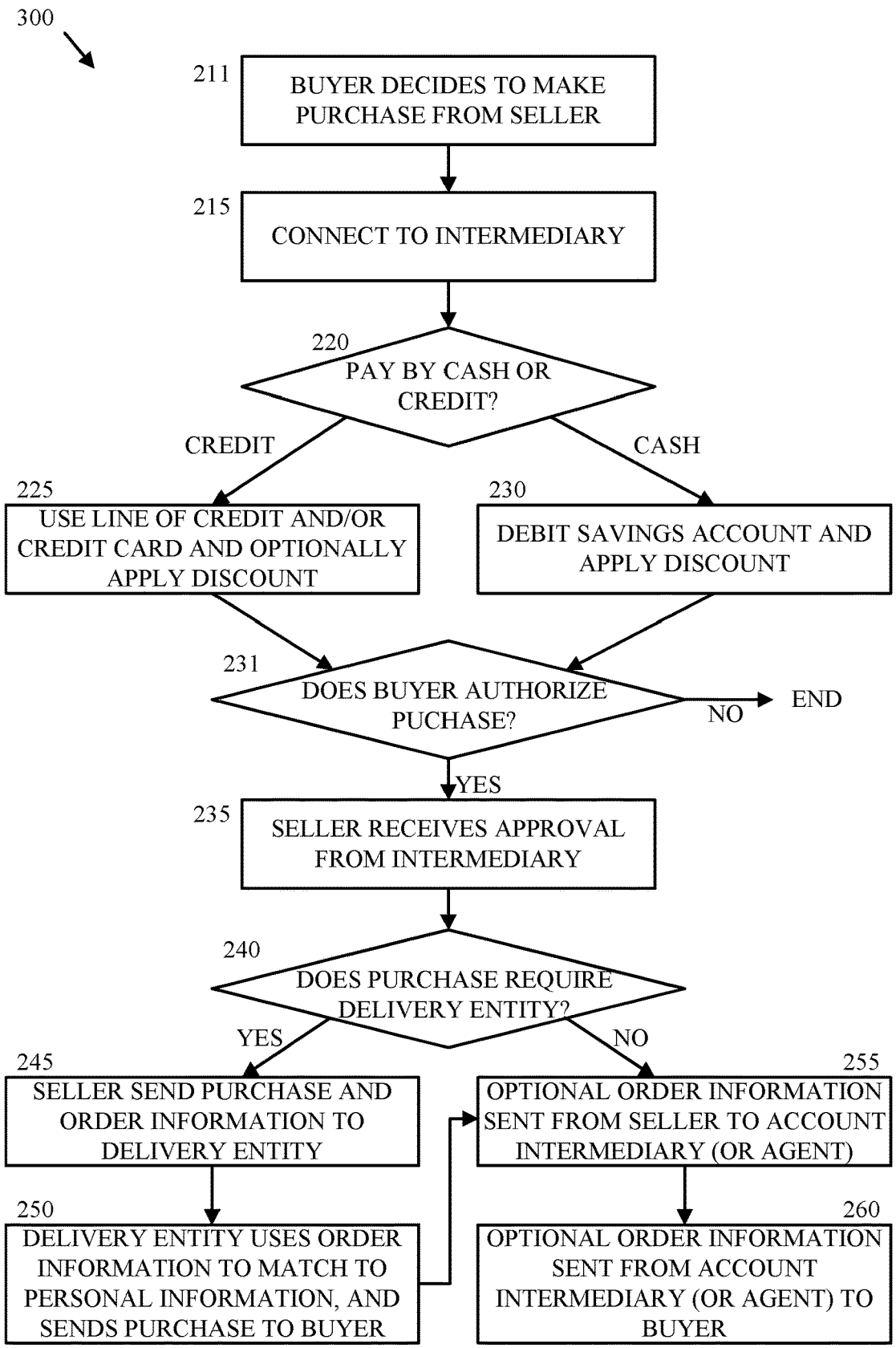
Figure 4:
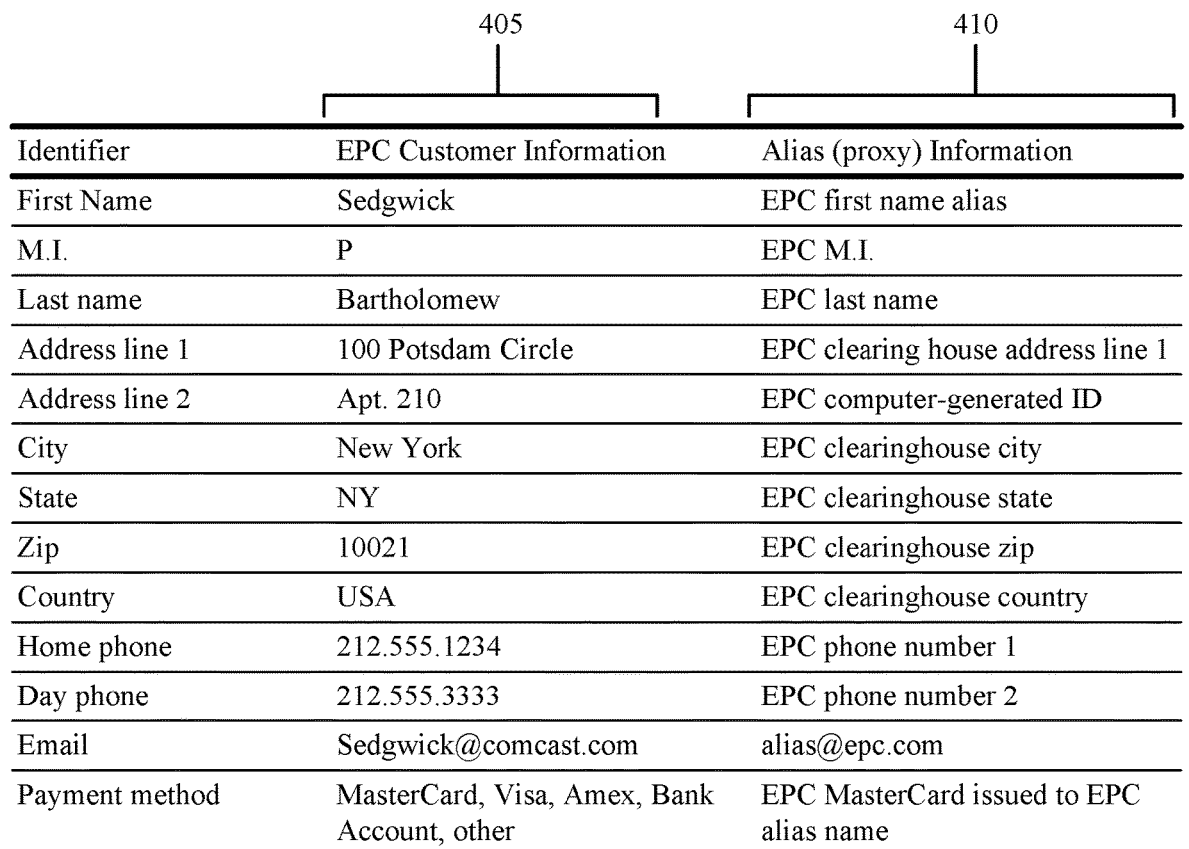
FIG. 4 illustrates buyer information that could be provided to the intermediary, as well as alias information that could be supplied by the intermediary to buyers and sellers, according to one embodiment of the invention.

FIG. 4 illustrates how alias information can be set up for the buyer, according to one embodiment. The buyer could create an alias first, middle and/or last name to associate with their private credentials. In one embodiment, if the buyer does not want the intermediary to know his personal information, a proxy intermediary can set up the alias information and that alias can be used by the intermediary. In another embodiment, the intermediate can be provided the actual legal name and/or other personal information of the buyer and the intermediary's computer 110 can generate a unique proxy name for each customer. In addition, the intermediary could use a clearinghouse address, unique customer identifier, and proxy phone numbers and email addresses. FIG. 4 illustrates buyer information 405 that could be provided to the intermediary's computer 110, as well as alias information 410 supplied by the intermediary's computer 110 to sellers. For each online transaction, the intermediary's computer 110 can tie the proxy name, address, and account identifier (e.g., credit card information, debit card information, account information) entered by the buyer at the seller's website on the seller's computer 105 with the buyer's correct personal information and payment information stored in a secure database controlled by the intermediary's computer 110 (and/or an outsourcer or partner of the intermediary). As explained below (with respect to FIG. 3), when physical goods are shipped by the seller, they can arrive at the intermediary's clearinghouse address, and then be relabeled and forwarded to the buyer's actual address. In addition, when sellers call or email a buyer, the seller can use the buyer's alias information, and the calls and emails can be sent to the intermediary, and then forwarded to the buyer. In this manner, by shielding personal information, buyer identities can be kept private when purchasing physical goods, enrolling in Internet services, and registering products. In addition, buyers can benefit by having only one place where they need to go to change their personal and/or contact information (i.e., the intermediary). The buyer's alias can remain constant even when buyers move, change phones and emails, and/or modify their payment methods.

In one embodiment, once the intermediary's computer 110 and/or the entity that has set up the account identifier has received the seller's request to process the buyer's purchase, the intermediary's computer 110 and/or the entity that has set up the account identifier can send an authorization communication to be sent to the buyer requesting authorization for the purchase. This authorization communication can be in the form of a written, voice, or other message to the buyer's computer 120 and/or mobile device (e.g., cell phone, Blackberry, PDA, GPS system, etc.). Because this authorization communication has already been determined to be based on the buyer's correct and unique contact information (because it was used to set up the buyer's account), the authorization communication can also authenticate the identity of the buyer. If the buyer fails to reply to the authorization communication within a required maximum wait period (which can be pre-set and changed according to preferences of the buyer, seller, and/or intermediary) or disapproves of the authorization communication, the intermediary's computer 110 can cause the declined message to be sent to the seller and/or the entity that set up the account identifier (e.g., the credit card company). If the buyer approves of the purchase described in the authorization communication, the intermediary's computer 110 can cause the approval message to be sent to the seller and/or the entity that set up the account identifier (e.g., the credit card company) and the transaction is completed.

In one embodiment, if the intermediary and/or the entity that set up the account identifier (e.g., the credit card company) declines to process the purchase for other reasons (e.g., not enough money in the account, not enough credit in the account, a hold on the account), other decline messages can be sent to the seller without sending the authorization communication to the buyer.

Note that the authorization communication (which can also authenticate the buyer) can follow a communication channel separate from the communication channel used to send the account identifier to the intermediary's computer 110 and/or the entity that set up the already existing account identifier. Thus, for example, the email that is sent to the buyer's computer 120 to authorize the purchase can be sent using a different communication channel than the communication channel that is used to send the credit card number from the seller to the credit card company (and then the intermediary's computer 110) using the seller's regular payment method. As another example, the voice mail or text message that is sent to the buyer's cell phone to authorize the purchase can be sent using a different communication channel than the communication channel used to send the account identifier to the intermediary's computer 110 using a special link on the seller's website. This process helps increase the security of the buying/selling process. To penetrate the process, a technically proficient person or organization would need to acquire both the account identifier (e.g., credit card number, account identifier) and the buyer's email or cell phone address and email. In addition, in one embodiment, the buyer would be required to login and provide a password using buyer's computer 120 in order to authorize the purchase once he had received the authorization communication. Additionally, in another embodiment, the authorization communication could be addressed to a pseudonym representing the buyer. This pseudonym would increase both the security and the privacy of the buyer. In an additional embodiment, the authorization communication could be digitally signed and encrypted.

In additional embodiments, the intermediary can offer the buyer a reward (e.g., points in a reward program, cash discount on the purchase) for using the intermediary to facilitate the purchase. In addition, in some embodiments, the intermediary can offer the buyer an additional or different reward for using particular different types of payment (e.g., cash, line of credit, credit card). For example, a 1% cash discount could be offered for buyers using the account identifier tied to a credit account; a 2% cash discount could be offered for buyers using the account identifier tied to a checking account; and a 3% cash discount could be offered for buyers using the account identifier tied to a savings account. Note that any type of reward or reward program can be utilized.

Once the buyer completes the purchase, the intermediary and the seller can exchange purchase information. For example, in one embodiment, the intermediary's computer 110 can send and/or make available the purchase information (e.g., receipt information, confirmation order, order number, details regarding the purchase) to the seller. In another embodiment, the seller can send and/or make available the purchase information to the intermediary. The purchase information can be sent by email or made available in any other manner (e.g., allowing an entity to access a program including the purchase information). In one embodiment, the purchase information can include the account identifier. As explained above, the purchase information can be sent or made available to the buyer (e.g., as confirmation of the purchase) from the seller in a manner that does not disclose the buyer's personal information. This can allow the buyer to have receipt or other information relating to the purchase without having to give his personal information to the seller. For example, an email confirmation can be sent from the intermediary's computer 110 to the buyer's computer 120. In another embodiment, purchase information can be sent or made available (e.g., from the seller) to the intermediary, and then repackaged and sent to the buyer. Alternatively, the purchase and/or the related purchase information can be made available by the seller to the buyer (e.g., with a web page receipt appearing on the seller's website at the seller's computer 105, downloading information directly from the seller's website, sending an item directly from the seller to the buyer, emailing information directly from the seller's computer 105 to the buyer's computer 120).

In another optional embodiment, if delivery of an item is required, the seller can send the purchase information to a delivery entity computer 115, such as a client computer, of a delivery entity. The delivery entity can match the purchase information to the personal information of the buyer, and send the purchase to the buyer. The delivery entity can receive the purchase information and personal information from the intermediary. Thus, for example, in one embodiment, the seller can send the purchase information, including the account identifier, to the intermediary and the delivery entity. The intermediary can then send some personal information (e.g., name, address) and the account identifier to the delivery entity. The delivery entity can then match the account identifier, purchase information, and personal information, and deliver and/or make available the purchase and/or any related documentation to the buyer. Note that, in one embodiment, the delivery entity (e.g., FedEx, DHL, UPS) could have an intermediary clearinghouse facility onsite at its distribution center. The clearinghouse facility could pick up the packages for the buyers binned separately by sorters, re-label them, and insert them back into the sorters to reenter the distribution stream of the deliver entity. In another example, the seller can send or make available the purchase information (e.g., using the seller's computer 105), including a confirmation number (but not the account identifier), to the intermediary (e.g., using the intermediary's computer 110) and the delivery entity (e.g., using the delivery entity's computer 115). The intermediary (e.g., using the intermediary's computer 110) can then send or make available some personal information and the confirmation number to the delivery entity (e.g., using the delivery entity's computer 115). The delivery entity (e.g., using the delivery entity's computer 120) can then match the confirmation number to the personal information, and deliver and/or make available the purchase and/or any related documentation to the buyer. The personal information sent to the delivery entity does not need to include all of the personal information of the buyer, and can only include minimal personal information (e.g., address, email address). Note that, in one embodiment, buyers could grant the intermediary permission to access their tracking information, which could then allow the intermediary to forward this information to the buyers.

Figure 2:
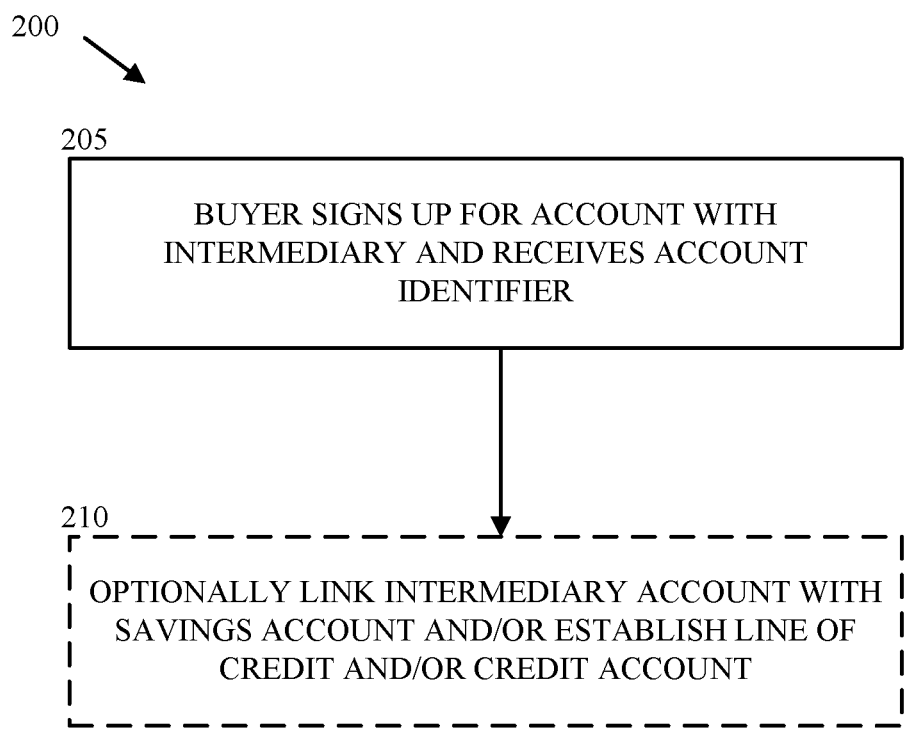
FIGS. 2-3 illustrate a computerized method of facilitating an online purchase between a buyer and a seller, according to one embodiment of the invention.

FIG. 2 illustrates a method 200 of creating an account for facilitating an online purchase between a buyer and a seller, according to one embodiment of the invention. In 205, a buyer signs up for an account with an intermediary and receives an intermediary account identifier. In one embodiment, the intermediary account identifier does not need to include personal information of the buyer (e.g., address information, phone information, name, financial information). In option 210, the intermediary account is linked with a buyer's savings account, checking account, line of credit, credit card, and or any other type of account.

FIG. 3 illustrates a method 300 of facilitating an online purchase between a buyer and a seller, according to one embodiment of the invention. In 211, in one embodiment, the buyer decides to make a purchase from a seller (e.g., on a seller's website at a seller's computer 105, at a store using a seller's computer 105), and chooses an item(s) and/or service(s) of interest. In 215, in order to provide payment information, the intermediary's computer 110 is accessed (e.g. having the buyer 120 access the intermediary's web page at the intermediary's computer 110 by selecting the intermediary's icon on the seller's website at the seller's computer 105, or having the buyer enter their account identifier in software installed on the seller's website at the seller's computer 105). Note that, in one embodiment, the seller's current payment software (e.g., for a credit card or PAYPAL) can be utilized. In this case, the intermediary would obtain access because the credit card company or PAYPAL could receive the information and forward it to the intermediary (e.g., at the intermediary's computer 110) for payment approval. In one embodiment, password information from the buyer can be entered here, or at any other point in the process.

In 220, it is determined if the buyer will pay by cash or credit. If the buyer wishes to pay by credit, in 225, the line of credit, credit card, and/or any other type of credit account is utilized for the purchase (e.g., using the computer 130). Note that, in one embodiment, the entity who manages the line of credit, credit card, and/or other type of credit account can provide authorization for the purchase (e.g., indicating that the account is in good standing and that there are enough funds in the account). An optional reward for using the account identifier to make the credit purchase can be provided. If the buyer wishes to pay by cash, in 230, the buyer's savings account, checking account, and/or any other cash account, is debited (e.g., using the computer 125), and an optional reward for using the account identifier to make the purchase and/or pay with cash, is provided. Note that, in one embodiment, the entity who manages the savings account, checking account, and/or other cash account can provide authorization for the purchase (e.g., indicating that the account is in good standing and that there are enough funds in the account). Note that the intermediary is able to encourage certain behavior by providing rewards. For example, credit cards charge a certain percentage of the item or service to the seller for the convenience of using the credit card. Often, this amount is 3%. Thus, if the buyer uses cash for the transaction, the intermediary can provide the buyer with a reward and still charge the seller the same or less than credit card companies. In addition, the intermediary can provide credit options to the buyer, such as a line of credit or credit card, and can still provide the buyer with a reward and again, still charge the seller the same or less than credit card companies. In optional 231, as described above with respect to FIG. 1, the intermediary (e.g., using the intermediary's computer 110) can send an authorization communication to the buyer (e.g., using the buyer's computer 120) to determine if the buyer approves of the purchase. If the buyer (e.g., using the buyer's computer 120) authorizes the purchase, the process moves to 235. If the buyer does not authorize the purchase, then the process ends. Note that, in some embodiments, if the buyer does not authorize the purchase, messages declining the purchase can be sent to the seller 105 (e.g., at the seller's computer 105).

In 235, the seller receives approval from the intermediary (e.g., the intermediary's computer 110 can forward the approval to the seller's computer 105). Note that, in one embodiment, because the seller has not received the buyer's personal information, the seller cannot track the buyer's shopping, or obtain any personal information about the buyer that it can use for its own marketing purposes, or that it can sell to others. Thus, the buyer has not compromised his identity or privacy by buying the item or service, and will not receive additional magazines, letters, and be put on other mailing lists (e.g., emailing lists, regular mail lists) as a result of buying the item or service. Furthermore, because the buyer's personal information is not moving around the interne, the buyer is less likely to have an identity theft problem. (However, note that in one embodiment, the buyer can choose to provide personal information to the seller, either on his own or using the intermediary. For example, the buyer may wish to be on the seller's mailing list, and may wish to provide information for this purpose.) Note that, in one embodiment, the buyer is only required to give his personal information once to the intermediary, but the buyer can still use the account identifier multiple times. In addition, in one embodiment, because the account identifier is not a credit card number (which is widely acceptable), the account identifier is harder to recognize, utilize, compromise, or misapply. In one embodiment, the account identifier is only usable through seller websites that have the technology (e.g., the ability to link to an electronic wallet, which is a web-browser plug-in that can handle and store a user's account identifier and payment information) to conduct business with the intermediary.

In 240, it is determined if the purchase requires a delivery entity. If yes, a delivery entity can be utilized. In 245, the seller can send or make available the purchase and/or related purchase information (e.g., confirmation email from the seller's computer 105) to the delivery entity (e.g., at the delivery entity's computer 115). Note that, in one embodiment, the purchase and/or related purchase information can be provided to the buyer directly from the seller (e.g., allowing a buyer to review a receipt on the seller's website at the seller's computer 105, allowing the buyer to download software and/or information from the seller's website at the seller's computer 105). In one embodiment, the purchase information does not require personal information identifying the buyer. In fact, the seller may not have access to any personal information at all. In 250, the delivery entity (e.g., using the delivery entity's computer 115) uses the order information to match the purchase information to the buyer's personal information, and sends and/or makes available the purchase and/or any related documentation to the buyer (e.g., at the buyer's computer 120). The delivery entity (e.g., using the delivery entity's computer 115) can receive the purchase information and personal information from the intermediary (e.g., sent by the intermediary's computer 110). Thus, for example, in one embodiment, the seller (e.g., using the seller's computer 105) can send or make available the purchase information, including the account identifier, to the delivery entity (e.g., at the delivery entity's computer 115). In one embodiment, the purchase information can also be sent to the intermediary (e.g., at the intermediary's computer 110). The intermediary (e.g., using the intermediary's computer 110) can then send or make available some personal information (e.g., name, address) and the account identifier to the delivery entity (e.g., at the delivery entity's computer 115). The delivery entity (e.g., using the delivery entity's computer 115) can then match the account identifier, and personal information, and deliver and/or make available the purchase and/or any related documentation to the buyer (e.g., at the buyer's computer 120). In another example, the seller (e.g., using the seller's computer 105) can send or make available the purchase information, including a confirmation number (but not the account identifier), to the delivery entity (e.g., at the delivery entity's computer 115). In one embodiment, the purchase information can also be sent to the intermediary (e.g., at the intermediary's computer 110). The intermediary (e.g., using the intermediary's computer 110) can then send or make available some personal information and the confirmation number to the delivery entity (e.g., at the delivery entity's computer 115). The delivery entity (e.g., using the delivery entity's computer 115) can then match the confirmation number to the personal information, and deliver or make available the purchase and/or any related documentation to the buyer (e.g., at the buyer's computer 120). Note that the personal information sent to the delivery entity or made available to the delivery entity does not need to include all of the personal information of the buyer, and can only include minimal personal information (e.g., address, email address). The process then moves to 255, as described below.

If the purchase does not require delivery by a delivery entity, the process moves from 240 directly to 255. In 255, optional order information is sent from the seller (e.g., using the seller's computer 105) to the intermediary (e.g., at the intermediary's computer 110). In 260, the optional order information is sent from the intermediary (or an agent of the intermediary, at the intermediary's computer 110 or the agent's computer) to the buyer (e.g., at the buyer's computer 120).

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. In fact, after reading the above description, it will be apparent to one skilled in the relevant art(s) how to implement the invention in alternative embodiments or in any combination of any embodiments. Thus, the present invention should not be limited by any of the above-described exemplary embodiments.

In addition, it should be understood that the figures and examples, which highlight the functionality and advantages of the present invention, are presented for example purposes only. The architecture of the present invention is sufficiently flexible and configurable, such that it may be utilized in ways other than that shown in the accompanying figures and examples.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope of the present invention in any way. Finally, it is the applicant's intent that only claim elements that include the express language "means for" or "step for" be interpreted under 35 U.S.C. 112, paragraph 6. Claim elements that do not expressly include the phrase "means for" or "step for" are not to be interpreted under 35 U.S.C. 112, paragraph 6.

The invention claimed is:

1. A computerized method of facilitating at least one purchase over at least one network between at least one buyer and at least one seller, comprising:
    storing, using at least one computer, signals representing a name and other personal information from the at least one buyer, and at least one cash account of the at least one buyer, and at least one credit account of the at least one buyer, wherein the other personal information comprises: address information, email address information, phone number information, and financial information;
    utilizing, using the at least one computer, the personal information to assign at least one account identifier to the at least one buyer, the at least one account identifier not including the name of the at least one buyer;
    allowing, using at least one computer, the at least one buyer to use the at least one account identifier to process payment using signals over the at least one network for the at least one purchase from the at least one seller, such that the buyer does not need to provide the name of the at least one buyer and the at least one seller does not require and does not obtain name of the at least one buyer; and
    crediting, using the at least one computer, the at least one buyer with at least one reward for using the at least one account identifier if the at least one buyer utilizes the at least one account identifier to make the at least one purchase, wherein different rewards are credited to the at least one buyer for using the at least one account identifier for different types of payments.

2. The method of claim 1, wherein the at least one buyer is only required by the at least one computer to provide the personal information once, but is allowed to utilize the at least one account identifier multiple times.

3. A computerized system for facilitating at least one purchase over at least one network between at least one buyer and at least one seller, comprising:
    at least one computer storing signals representing a real name and other personal information from the at least one buyer, wherein the other personal information comprises at least two of: address information, email address information, phone number information, and financial information;
    the at least one computer utilizing the personal information to assign at least one account identifier to the at least one buyer, the at least one account identifier not including the real name of the at least one buyer;
    the at least one computer allowing the at least one buyer to use the at least one account identifier to process payment using signals over the at least one network for the at least one purchase from the at least one seller, such that the buyer does not need to provide the real name of the at least one buyer and the at least one seller does not require and does not obtain the real name of the at least one buyer; and
    the at least one computer crediting the at least one buyer with at least one reward for using the at least one account identifier if the at least one buyer utilizes the at least one account identifier to make the at least one purchase, wherein different rewards are credited to the at least one buyer for using different types of payment.

4. The system of claim 3, wherein the at least one buyer is only required to provide the personal information once, but is allowed to utilize the at least one account identifier multiple times.

5. The system of claim 3, wherein the at least one account identifier is tied by the at least one computer to at least one savings account and/or at least one checking account.

6. The system of claim 3, wherein the at least one account identifier is tied by the at least one computer to at least one credit account.

7. The method system of claim 6, wherein the at least one credit account is: at least one line of credit and/or at least one credit card.

8. The system of claim 3, wherein at least one reward different than the at least one reward for utilizing cash is credited if the at least one buyer utilizes credit to make the at least one purchase.

9. The system of claim 3, further comprising:
    the at least one computer performing processing related to sending and/or making available information to at least one delivery entity tying the personal information of the at least one buyer to purchase information;
    the at least one computer performing processing related to requiring the at least one seller to send and/or make available any purchased items and/or related documentation to the at least one delivery entity; and
    the at least one computer performing processing related to requiring the at least one delivery entity to deliver and/or make available any purchased items and/or related documentation to the at least one buyer by matching the purchase information with the personal information of the at least one buyer to obtain personal information required to deliver and/or make available any purchased items and/or related documentation.

10. The system of claim 3, wherein the at least one reward is a discount on the at least one purchase.

11. The method of claim 3, further comprising:
    the at least one computer performing processing related to receiving confirmation of the at least one purchase; and
    the at least one computer performing processing related to forwarding and/or making available the confirmation to the at least one buyer.

12. The method of claim 3, further comprising: performing processing related to requiring the at least one buyer to enter password information associated with the at least one account identifier.

13. The method of claim 1, wherein the other personal information comprises: address information, email address information, phone number information, or financial information, or any combination thereof.

14. The system of claim 3, wherein the other personal information comprises at least three of: address information, email address information, phone number information, or financial information, or any combination thereof.

15. The method of claim 1, further comprising:
    receiving confirmation of the at least one purchase.

16. The method of claim 15, wherein the confirmation is written.

17. The method of claim 15, wherein the confirmation is by voice.

18. The method of claim 1, further comprising: forwarding and making available confirmation of the at least one purchase to the at least one buyer.

19. The method of claim 1, further comprising:
performing processing related to sending and/or making available information to at least one delivery entity tying the personal information of the at least one buyer to purchase information;
performing processing related to requiring the at least one seller to send and/or make available any purchased items and/or related documentation to the at least one delivery entity; and
performing processing related to requiring the at least one delivery entity to deliver and/or make available any purchased items and/or related documentation to the at least one buyer by matching the purchase information with the personal information of the at least one buyer to obtain personal information required to deliver and/or make available any purchased items and/or related documentation.

20. The method of claim 1, wherein the at least one account identifier is tied by the at least one computer to: at least one savings account, at least one checking account, at least one credit account.

* * * * *